US012274659B2

(12) United States Patent
Hoch et al.

(10) Patent No.: US 12,274,659 B2
(45) Date of Patent: Apr. 15, 2025

(54) ADULT TOY WITH TRANSPARENT OUTER BODY

(71) Applicant: HOCH BRANDS LLC, Boca Raton, FL (US)

(72) Inventors: Charles V. Hoch, Boca Raton, FL (US); Bruce A. Hoch, Boca Raton, FL (US)

(*) Notice: Subject to any disclaimer, the term of this patent is extended or adjusted under 35 U.S.C. 154(b) by 511 days.

(21) Appl. No.: 17/503,173

(22) Filed: Oct. 15, 2021

(65) Prior Publication Data

US 2023/0120283 A1 Apr. 20, 2023

(51) Int. Cl.
*A61H 19/00* (2006.01)

(52) U.S. Cl.
CPC ......... *A61H 19/44* (2013.01); *A61H 2201/01* (2013.01); *A61H 2201/1692* (2013.01)

(58) Field of Classification Search
CPC ............ A61H 19/44; A61H 2201/1692; A61H 2201/01
USPC ............................................................ 600/38
See application file for complete search history.

(56) References Cited

U.S. PATENT DOCUMENTS 1,277,159 A 8/1918 Walker
1,934,115 A 11/1933 James
2,335,786 A 11/1943 Mullica
4,252,135 A 2/1981 Herman
5,021,638 A 6/1991 Nopper et al.
6,390,141 B1 5/2002 Fisher et al.
6,776,755 B1 * 8/2004 Raskin ...................... A61F 5/41 600/39
7,990,288 B2 * 8/2011 Marchetto .............. G08C 17/00 341/23
9,649,249 B1 * 5/2017 Green .................... A61H 19/32
11,058,148 B2 7/2021 Hoch et al.
2006/0135892 A1 * 6/2006 Nan ....................... A61H 19/44 601/72
2009/0275796 A1 * 11/2009 Gil ......................... A61H 19/44 600/38
2010/0204542 A1 * 8/2010 Hodge ...................... A61F 5/41 600/39
2011/0036363 A1 2/2011 Urtsev et al.
2011/0061665 A1 3/2011 Hylton (Continued)

OTHER PUBLICATIONS

Corning Museum of Glass , "Reticello", https://www.youtube.com/watch?v=xCrdewFgObc; (Accessed Jan. 4, 2021), Nov. 23, 2011, 3 pages.

(Continued)

*Primary Examiner* — Samuel G Gilbert
(74) *Attorney, Agent, or Firm* — Dorsey & Whitney LLP

(57) ABSTRACT

An adult toy article including a main body including a rear, central and front portions and defining a tip end and a rear end, and including an inner body and an outer body overlaying at least a portion of the inner body, each of the inner body and outer body defining a rear, central and front portion corresponding to the rear, central and front portion of the main body. The central portion of the inner body may define at least in part an elongated shape. The front portion of the inner body may define a tapering cone-shape with a rounded front end. The outer body may overlay at least a portion of the inner body, the outer body being sufficiently transparent to view at least a portion of the inner body there through.

21 Claims, 14 Drawing Sheets

(56) References Cited

U.S. PATENT DOCUMENTS

| | | | | |
|---|---|---|---|---|
| 2013/0116501 | A1 * | 5/2013 | Lee | A61H 23/02 600/38 |
| 2015/0143846 | A1 * | 5/2015 | Liberman | A44C 5/0084 63/3 |
| 2016/0008215 | A1 * | 1/2016 | Pfeiffer | A61H 23/02 600/38 |
| 2021/0329968 | A1 | 10/2021 | Hoch et al. | |

OTHER PUBLICATIONS

Himalayan Group Inc. , "Clear Silicone Hand Water Pipe SL98", http://www.himalayanglass.com/product/clear-silicone-hand-water-pipe-sl-98/, (Accessed Sep. 20, 2019), 7 pages.
OOZE , "Stack Pipe—Stack Pipe Silicone Bubbler—Orange / Clear", https://www.oozelife.com/products/ooze-stack-pipe-silicone-bubbler-orange-clear, (Accessed Jan. 4, 2021), 5 pages.
PROTOLABS , "Design Considerations for Overmolding and Insert Molding", https://www.glasspipesla.com/5-Frosted-Clear-Showerhead-Perc-Mini-Silicone-Water-Pipe-w-Clear-Bowl_p_9252.html, (Accessed Sep. 20, 2019), 10 pages.
PUFFCO , "The Lucid Lightning Peak", https://www.puffco.com/products/the-lucid-lightning-peak, (Accessed Sep. 20, 2019), 11 pages.
PYPTEK , "Pyptek Pocket Pipe", https://www.pyptek.com/product/pyptek-pocket/, (Accessed Sep. 20, 2019), 3 pages.
Shenzhen YHS Plastic, Technology Co., Ltd. , "Unbreakable Silicone Super Clear Syringe Nectar Collector", https://yhs-silicone.en.made-in-china.com/product/ivXnprEbugRJ/China-Unbreakable-Silicone-Super-Clear-Syringe-Nectar-Collector.html, (Accessed Sep. 20, 2019), 10 pages.
Smoke Rolla , "3.25" Chillum Pipe Silicone Cover Glass Pipe Color Design", https://wholesale.smokerolla.com/collections/hand-pipes-wholesale/products/3-25-chillum-pipe-silicone-cover-glass-pipe-color-design, (Accessed Sep. 20, 2019), 3 pages.
Twisted Labs , "Fuchsia LED Beaker Silicone Water Pipe", https://www.thetwistedlab.com/product/fuchsia-led-beaker-silicone-water-pipe/, (Accessed Sep. 20, 2019), 3 pages.
WAXMAID , "3" Silicone & Glass Hybrid Blunt Bubbler", https://waxmaidstore.com/collections/water-pipes/products/waxmaid-bubbler, (Accessed Sep. 20, 2019), 3 pages.
WAXMAID , "8.5" Horn Silicone & Glass Hybrid Water Pipe", https://waxmaidstore.com/collections/water-pipes/products/horn-water-pipe, (Accessed Sep. 20, 2019), 3 pages.
WAXMAID , "Waxmaid Nectar Collector", https://waxmaidstore.com/collections/nector-collector, (Accessed Sep. 20, 2019), 2 pages.

* cited by examiner

ADULT TOY WITH TRANSPARENT OUTER BODY

BACKGROUND

The sophistication of technology used in adult toys has increased significantly. However, the shape and appearance of adult toys has seemed to have stagnated, as they tend to either have a somewhat geometric shape, such as having smooth curves and oblong shapes, or are ultra-realistically shaped, such as being based on moldings taken from body parts. The appearance of the adult toys has also plateaued, with the various articles often having simple colors and patterns, ranging from skin tone colors to bright colors likely designed to attract attention. There is a need for an adult toy that creates an appearance of being made of a material inappropriate for use as an adult toy, while being able to take on a variety of shapes, including ranging between the somewhat geometric shape to the ultra-realistic shape.

BRIEF SUMMARY

An adult toy is disclosed. In one example, an adult toy including a main body including a rear, central and front portions and defining a tip end and a rear end, and including an inner body and an outer body overlaying at least a portion of the inner body, each of the inner body and outer body defining a rear, central and front portion corresponding to the rear, central and front portion of the main body. The central portion of the inner body defining at least in part an elongated shape, and the front portion of the inner body defining a tapering cone-shape with a rounded front end. The outer body may overlay at least a portion of the inner body, wherein the inner body is at least partially visible through the outer body. Additionally, a thickness of the outer body on the central portion may be consistent.

Optionally or additionally, a thickness of the outer body over the front portion is greater than a thickness of the outer body over the central portion. Optionally or additionally, the thickness of the outer body over the front portion is about twice as thick as the thickness of the outer body over the central portion; and the outer body over the front portion replicates the shape of the front portion of the inner body.

Optionally or additionally, the outer body may define an outer surface, and the outer surface replicates the shape of the central portion and the front portion of the inner body.

Optionally or additionally, the inner body may define an outer surface and the outer surface may include at least one feature element positioned on the outer surface. The outer body may define an outer surface that overlays the outer surface of the inner body and the at least one feature element, and a thickness of the outer body over the feature element is the same as or less than a thickness of the outer body over the outer surface of the inner body.

Optionally or additionally, the at least one feature element includes an elongated first feature element extending along a majority of the length of the inner body including along at least part of the central portion and at least part of the front portion, and an elongated second feature element extending along a majority of the length of the inner body including at least part of the central portion and at least part of the front portion, and the at least two feature elements protrude from the outer surface of the inner body. Optionally or additionally, the second feature element is positioned on an opposite side from the first feature element. Optionally or additionally, the first and second feature elements each extend in a non-linear manner. Optionally or additionally, the at least one feature element protrudes from the outer surface of the inner body.

Optionally or additionally, the at least one feature element is a plurality of protruding nubs extending from the outer surface of the inner body, and the plurality of protruding nubs are exposed through the outer surface of the outer body.

Optionally or additionally, a portion of the plurality of protruding nubs are aligned linearly along at least the central portion of the inner body.

Optionally or additionally, a portion of the plurality of protruding nubs are aligned along the length of at least the central portion of the inner body in more than two equally spaced rows.

Optionally or additionally, there may be three rows of protruding nubs aligned along at least the central portion and spaced equidistant from an adjacent row.

Optionally or additionally, the at least one feature element may be embedded in a recess formed in the outer surface of the inner body, and the at least one feature element protrudes from the surface of the inner body. Optionally or additionally, the feature element is flush with the outer surface of the inner body.

Optionally or additionally, the recess formed in the outer surface of the inner body corresponds to the shape of the engagement of the at least one feature element with the outer surface of the inner body.

Optionally or additionally, the at least one feature element is attached to the outer surface of the inner body.

Optionally or additionally, the toy may include at least one feature element separate from the inner body and suspended in the outer body. Optionally or additionally, the outer body defines a layer thickness; and the at least one feature element is positioned outside the top 10% of the layer thickness. Optionally or additionally, the outer body defines a layer thickness; and the at least one feature element is positioned in the bottom 10% of the layer thickness. Optionally or additionally, the outer body defines a layer thickness, and the at least one feature element is positioned in the middle third of the layer thickness.

Optionally or additionally, the inner body of the toy may define a recess with an opening defined in the rear portion, and include a container defining an interior chamber having an open front end and a closed rear end, and wherein the container is received within the recess, with the open front end oriented toward the front portion of the inner body and the closed rear end oriented toward the rear portion of the inner body. Optionally or additionally, the container is cylindrical in shape. Optionally or additionally, the outer body may be transparent.

Additional embodiments and/or features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

DETAILED DESCRIPTION

The following description generally relates to an adult toy article, apparatus or device that is made in a manner that creates an appearance of the toy being made of glass or another like material not considered appropriate for an adult toy, but is actually safe to use for this purpose, and is able to be shaped, molded, and formed into many different varieties of adult toys. The adult toy article described herein generally includes a main body defined by an inner body and an outer body. The inner body has a generally elongated shape having a tapered front end. The outer body overlays all or a portion of the inner body. The outer body is transparent or partially transparent so that the inner body may be viewed through the outer body. Where the outer body is sufficiently transparent, the main body appears to be a glass-like, substance. The appearance of glass used on this type of device is unique, counter-intuitive and unusual. Additionally, the transparent or partially transparent outer body allows relief features, if any, that are positioned on the outer surface of the inner body to affect the appearance and/or function/effectiveness of the device, and may be readily seen and appreciated.

The outer body of the apparatus described herein at least partially, covers the inner body. In some examples, the outer body of the apparatus may include a layer of an at least partially transparent flexible or resilient material, such as for example, silicone rubber, formed over an inner body. In some examples, the inner body may have a relief feature or features that visibly depicted through the outer body. In some examples, the apparatus may be formed using a technique commonly known as over-molding or insert-molding. In some examples, the inner body may include a recess for removably receiving a container. In one example, where the outer body is formed of transparent silicone rubber the disclosed apparatus and/or method may provide an advantage in contrast to adult toys made of other materials because while it looks like it is made of glass, the flexible outer body it is able to withstand somewhat rough handling, such as that when the apparatus may be used and/or otherwise handled.

While the examples used throughout are based on the traditional elongated, torpedo shaped adult toy, the inner body, as well as the overlying outer body, may be shaped, molded, or formed into a variety of shapes suitable for many intended adult toy purposes.

Figure 3:
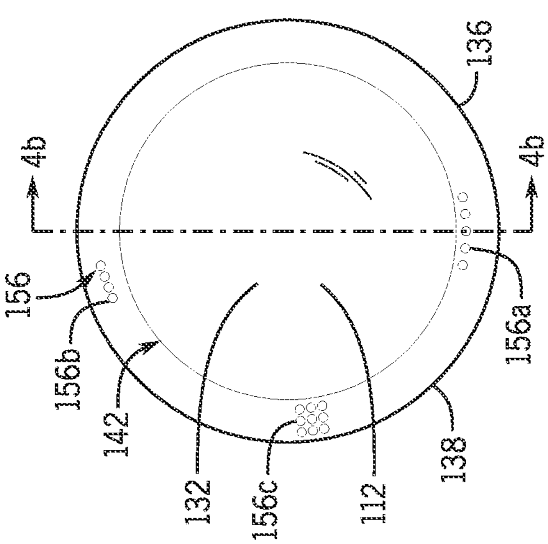
FIG. 3 is a front elevation view of an example of an adult toy as described in the present disclosure.
Figure 1:
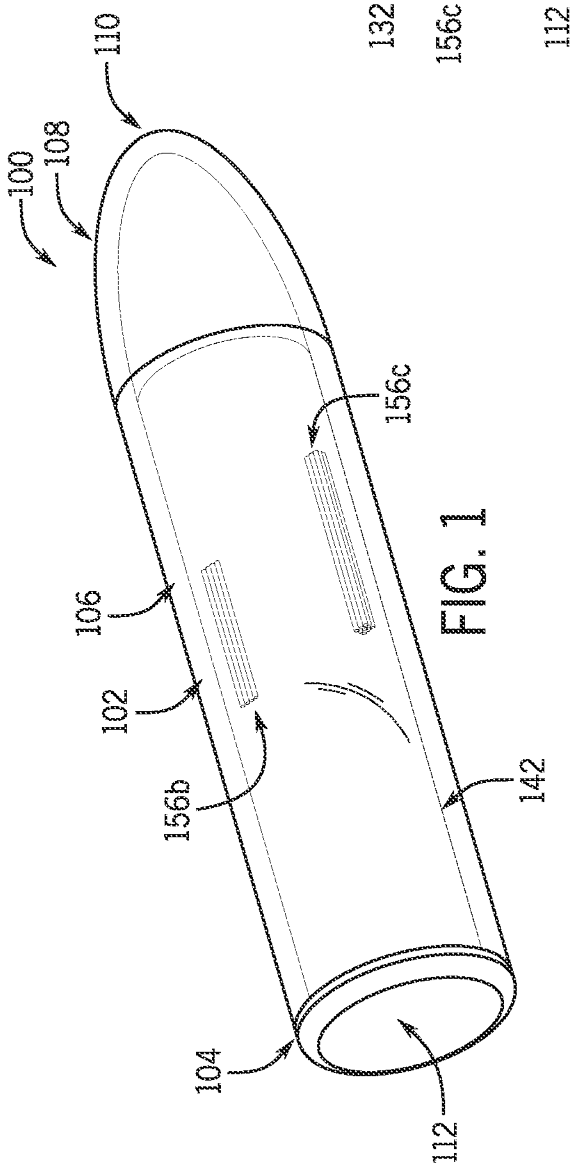
FIG. 1 is a perspective view of an example of an adult toy as described in the present disclosure.
Figure 2:
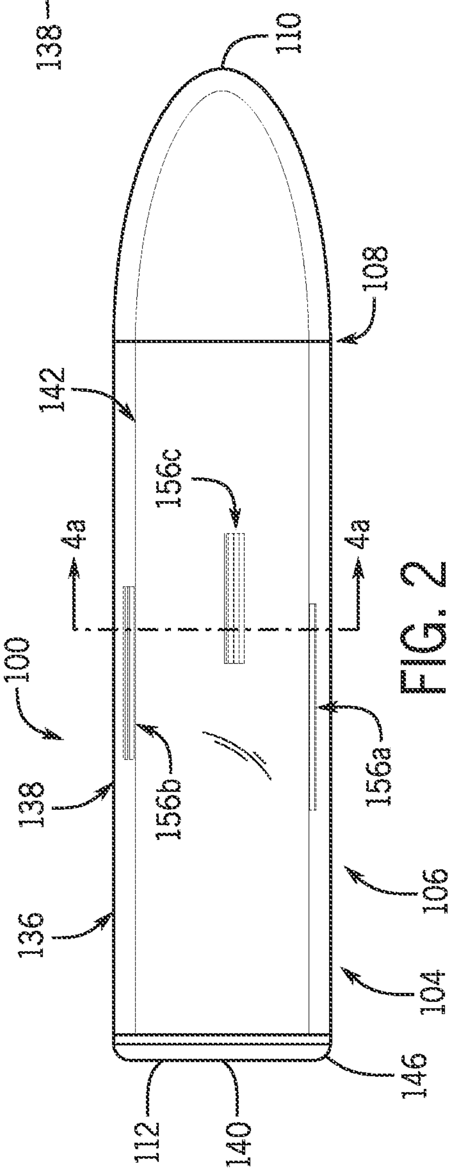
FIG. 2 is a side elevation view of an example of an adult toy as described in the present disclosure.

Referring to FIGS. 1 through 4*b* an adult toy 100 is shown including a main body 102 defining a rear 104, central 106 and front 108 portions. The front portion 108 includes a tip end 110 and the rear portion 104 includes a rear end 112. The main body 102 includes an inner body 114 and an outer body 116 overlaying at least a portion of the inner body 114. Each of the inner body 114 and outer body 116 also include a respective rear 118, 120, central 122, 124 and front 126, 128 portions corresponding to the rear 104, central 106 and front 108 portion of the main body 102. Additionally, both the inner body 114 and the outer 116 body respectively include a tip end 130, 132 defined by the respective front portion and a rear end defined by the respective rear portion. The front 108, central 106, and rear 104 portions may be integrally formed about the main body 114. Alternatively, the front 108, central 106, and/or rear 104 portions may each be separately formed about the inner body 114. In one example, an optional seam line 119, such as shown in FIGS. 1 and 2 may be formed between the front portion 108 that is formed about the inner body 114 separately and not integrally with the formation of the central portion 106 about the inner body 114. This seam 119 may be shown throughout in the Figures of this description but is not a required feature of the invention(s) disclosed herein.

Figure 4A:
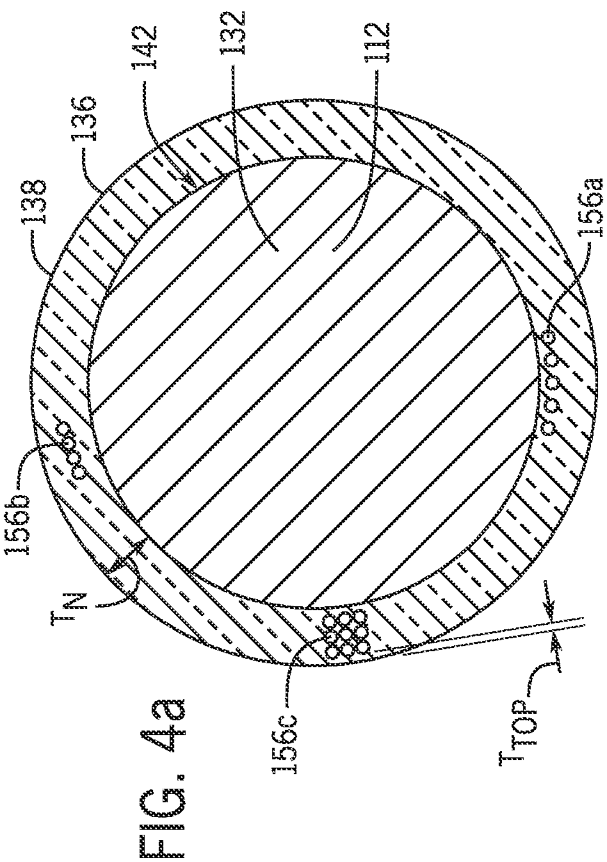
FIG. 4*a* is a section view taken along line 4*a*-4*a* of FIG. 2 of an example of an adult toy as described in the present disclosure.
Figure 4B:
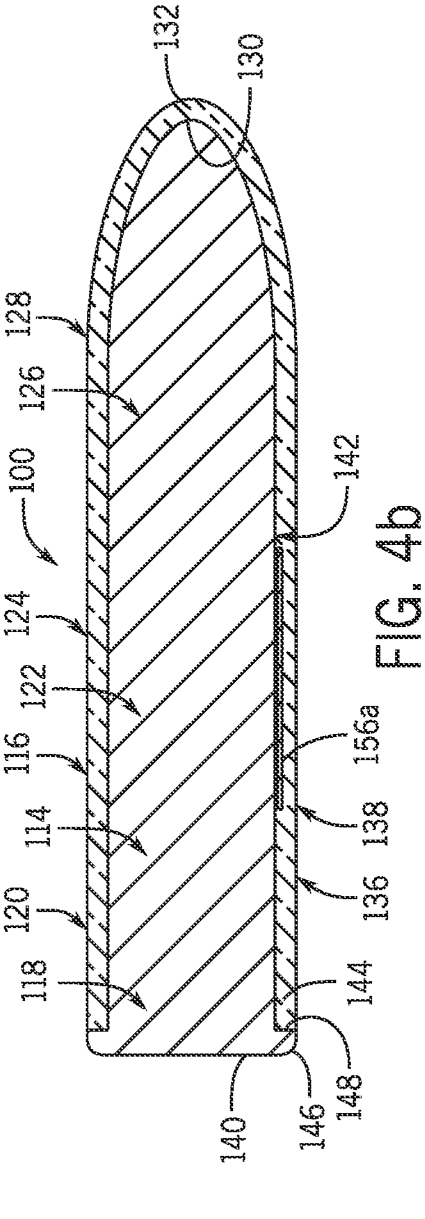
FIG. 4*b* is a section view taken along line 4*b*-4*b* of FIG. 3 of an example of an adult toy as described in the present disclosure.
Figure 7:
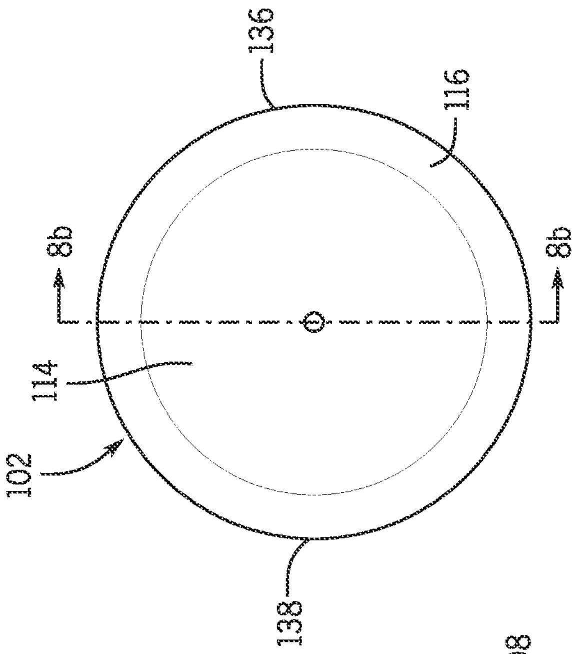
FIG. 7 is a front elevation view of an example of an adult toy as described in the present disclosure.

The outer surface 136 of the main body 102, which is this example includes the outer surface 138 of the outer body 116, forms an elongated shape, which in this example has a circular cross-section, for example shown in FIG. 4*a*. In this example, the cross-sectional shape of the rear 104 and/or central portions 106 may have a common diameter, such as to form a cylinder. The front portion 108 may have a decreasing diameter to form a tapering cone-shape with a rounded front end, defining the tip end 110. See FIG. 4*b*. The cross section of the main body 102 may have other shapes, such as other geometric shapes, non-geometric shapes, or a combination. The cross sectional shape may vary along the length of the main body 102.

The inner body 114 defines an outer surface 142, and forms an elongated shape, which in this example has a circular cross-section, for example shown in FIG. 4*a*. In this example, the cross-sectional shape of the rear 118 and/or central 122 portions of the inner body 114 may have a common diameter, such as to form a cylinder. The front portion 126 of the inner body 114 may have a decreasing diameter to form a tapering cone-shape with a rounded front end, defining an inner body tip end 130. The cross section of the inner body 114 may have other shapes, such as other geometric shapes, non-geometric shapes, or a combination. The cross sectional shape may vary along the length of the inner body 114.

The outer body 116 overlays at least a portion of the inner body 114. The outer body 116 may be sufficiently transparent, including transparent, partially transparent, translucent, or partially translucent, to view at least a portion of the inner body 114, and associated relief features if any, there through. The outer body 116 may be made of silicone rubber, for example including compression molded, platinum cured silicone rubber. Examples of a silicone rubber that may be at least partially transparent include 100% optically clear liquid silicone rubber, clouded clear compression molded silicone rubber, hardened silicone and heat-cured rubber (HCR) silicone. The outer body 116 may have different transparency levels overlaying different parts of the inner body 114. This may improve the appearance of the article, or may emphasize various feature elements of the article. It also may have a functional basis, where the areas of higher use or friction may be less noticeable if the outer layer in those areas is less transparent. For instance, the transparency level of the outer body 116 extending over the tip end 130 of the inner body 114 may be lower than the transparency level of the outer body 116 extending over the central portion 122 of the inner body 114. The inner body 114 may also be made of silicone rubber, or may also be made of materials that provide some level of rigidity or stiffness, including plastic, metal, composites, or the like. The nominal thickness Tn of the outer body 116 may be a layer of between 1 mm to 3 centimeters thick, or more or less, depending on the application. A nominal thickness of 0.5 cm may be considered acceptable. The largest nominal cross sectional dimension (such as that of FIG. 4*a*) of the inner body 114 may range from approximately 1.5 centimeters to 5 centimeters, or more or less depending on the application. This largest nominal cross sectional dimension may not include the measurement of protruding feature elements, if any. These example characteristics of the type of material of the outer body 116 and the inner body 114, as well as the thickness of the outer body 116, and the diameter of the inner body 114 generally apply to the various embodiments described throughout unless otherwise stated.

The outer surface 138 of the outer body, as shown in this example, may have a shape that at least partially conforms to and replicates the shape of the inner body 114. As shown, for example, the outer body 116 replicates the shape the inner body along the central portion 122, the front portion 126, and at least part of the rear portion 118, but not the terminal rear end 140 of the inner body 114. In some examples, the outer surface 138 of the outer body 116 may however define a shape that does not conform to the shape of the inner body 114, and instead may have a shape different than the shape of the inner body 114. For one example, the outer surface 138 of the outer body 116 may form a circular cross section while the outer surface 142 of the inner body 114 may form a non-circular cross section, such as for example a square cross section.

The rear end 140 of the inner body 114 may extend beyond the rear end 144 of the outer body 116, and may form a rim 146 that radially overlaps at least a portion of the rear terminal end 144 of the outer body 116. The rear terminal end 144 of the outer body 116 defines a terminal edge 148 that, in this example, abuts with the rim 146. The terminal end 144 of the rear portion 120 of the outer body 116 may abut the rim 146 continuously, or discontinuously, and may in some examples not abut the rim 146. The rim 146 may form a gripping feature for a user to grasp in order to move the main body 102. In some examples, at least some portions of the edge of the outer rim 146 may be flush with the outer surface of the outer body, and thus also with the main body. The rim 146 may form a continuous annular periphery, or may be formed as cog teeth, or may take other continuous or discontinuous shapes. The rim 146 may extend beyond the outer surface 138 of the outer body 116, or may not extend all the way to the outer surface 138 of the outer body 116.

Figure 5:
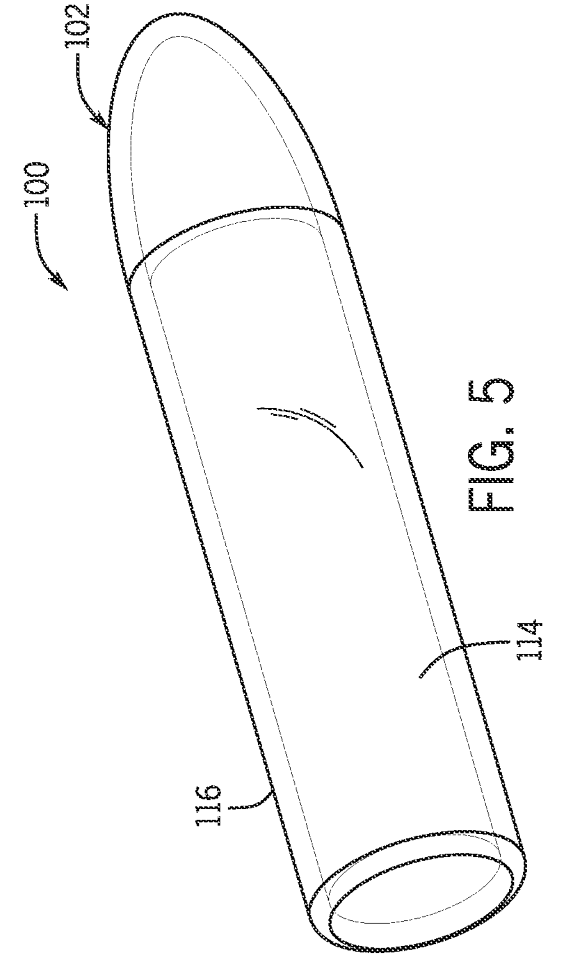
FIG. 5 is a perspective view of an example of an adult toy as described in the present disclosure.
Figure 6:
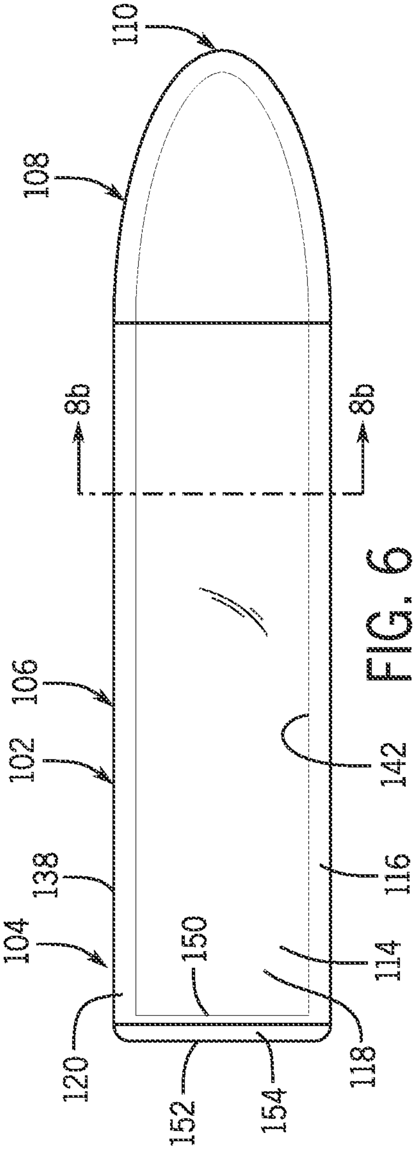
FIG. 6 is a side elevation view of an example of an adult toy as described in the present disclosure.
Figure 8A:
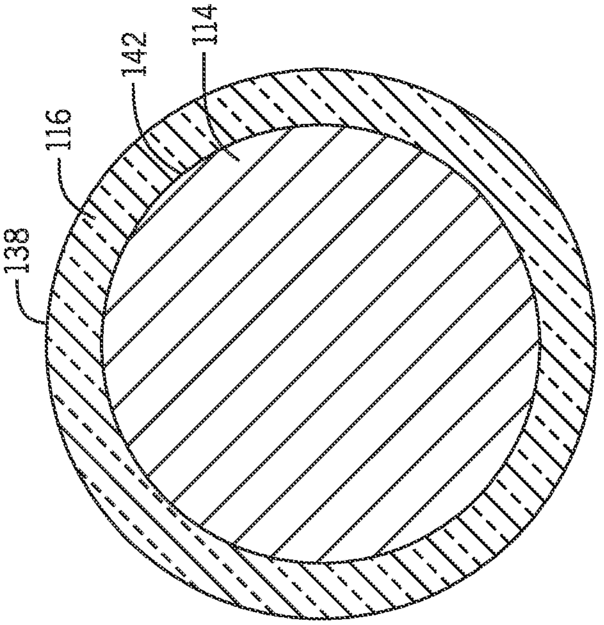
FIG. 8*a* is a section view taken along line 8*a*-8*a* of FIG. 6 of an example of an adult toy as described in the present disclosure.
Figure 8B:
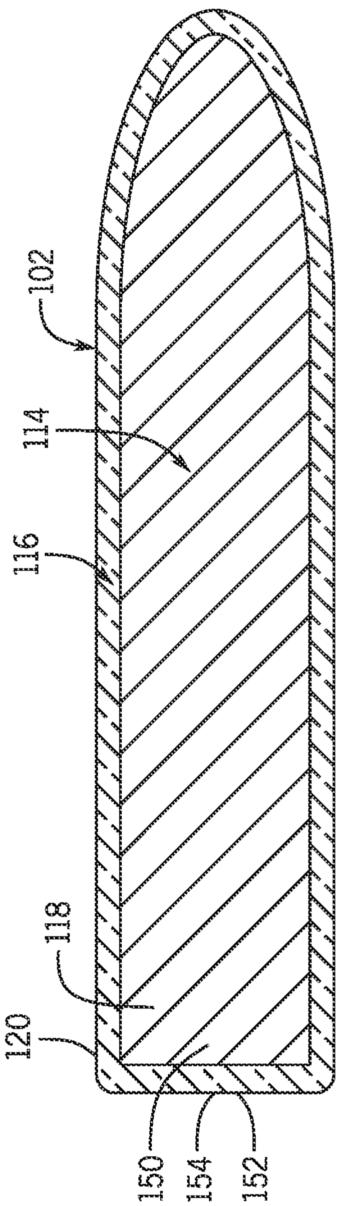
FIG. 8*b* is a section view taken along line 8*b*-8*b* of FIG. 7 of an example of an adult toy as described in the present disclosure.

Another example of the toy is shown in FIGS. 5 through 8*b*. The main body 102, inner body 114 and outer body 116 are substantially the same as or similar to the corresponding structure shown in FIGS. 1-4*b*, with the primary difference being the structure of the rear portion 118 of the inner body 114. The cross sectional shapes of the main body 102, inner body 104 and outer body 116 as shown in FIGS. 5, 6, 7, 8*a* and 8*b* correspond closely to those shown in and described with respect to FIGS. 1, 2, 3, 4*a* and 4*b*. As best shown in FIGS. 5 and 8*b*, the rear portion 118 of the inner body 114 includes a rear end 150 that may be a flat planar surface recessed from the terminal end of the rear portion 120 and rear end 152 of the outer body 116. The rear portion 120 of the outer body 116 includes a layer 154 covering over the rear end 150 of the inner body 114.

In another example, the rear end 150 of the inner body 114 may be exposed or uncovered at the rear end 152 of the outer body 116 by the rear layer 154 being absent, leaving a wall extending at least partially around the periphery of the rear end 144 of the outer body 116. In this example, the rear end 150 of the inner body 114 is accessible through the outer body 116.

Because the inner body 114 may be seen through the outer body 116, which relief features 160 applied to the inner body 114 may provide aesthetic and/or functional enhancements to the toy. Examples of relief features 160 are shown and described with respect to FIGS. 9-13, FIGS. 14-18, and FIGS. 19-23. In these examples, the main body 102, inner body 114 and outer body 116 are substantially the same as or similar to the corresponding structure shown in FIGS. 1-4*b*, with the primary difference being that relief features 160 are positioned on the outer surface 142 of the inner body 114. The cross sectional shapes of the main body 102, inner body 114 and outer body 116 in these examples are the same as or correspond closely to those shown in and described with respect to FIGS. 1, 2, 3, 4*a* and 4*b*.

Figure 9:
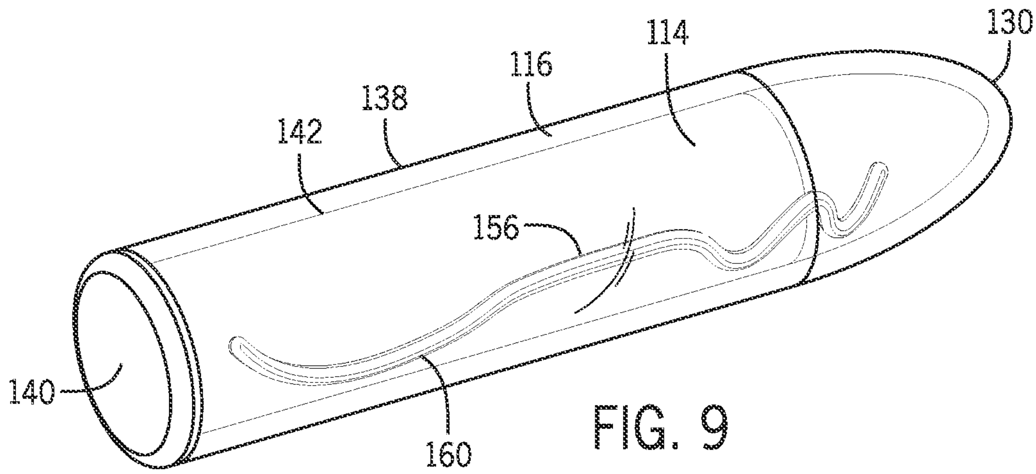
FIG. 9 is a perspective view of an example of an adult toy as described in the present disclosure.
Figure 10:
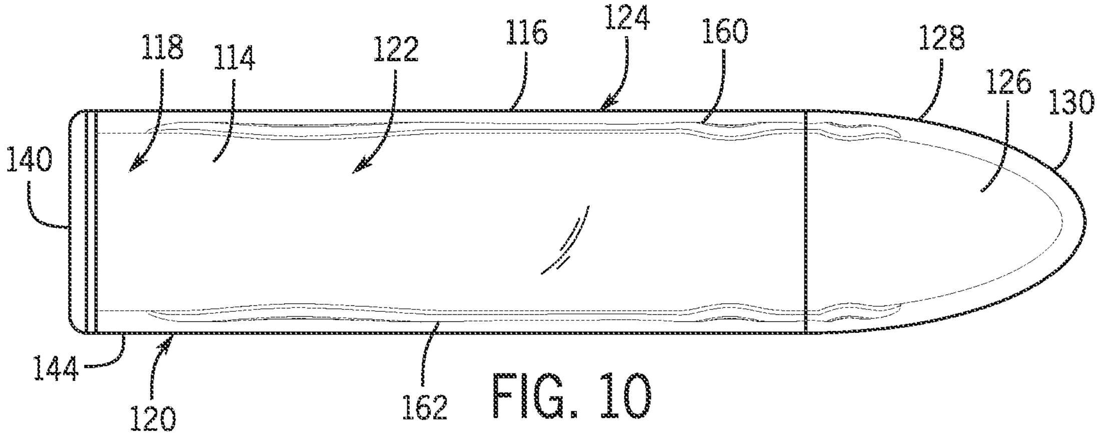
FIG. 10 is a top plan view of an example of an adult toy as described in the present disclosure.
Figure 11:
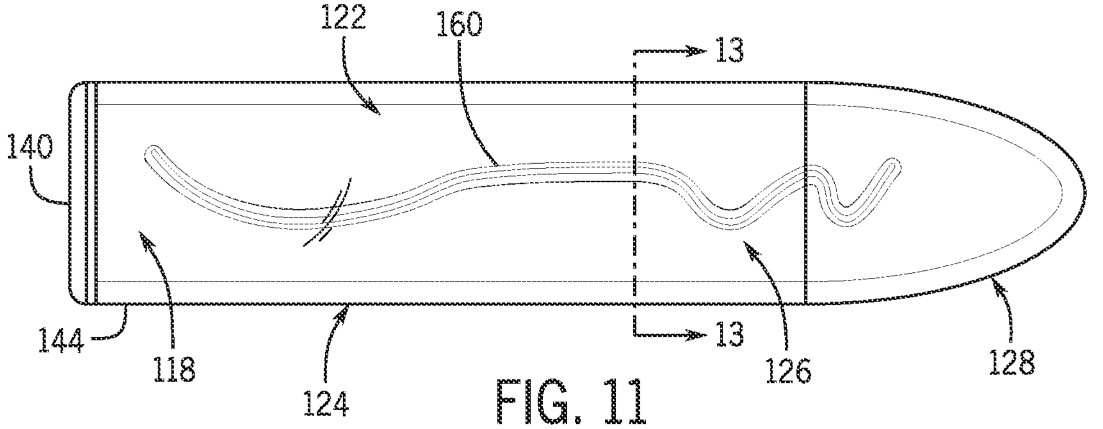
FIG. 11 is a side elevation view of an example of an adult toy as described in the present disclosure.
Figure 12:
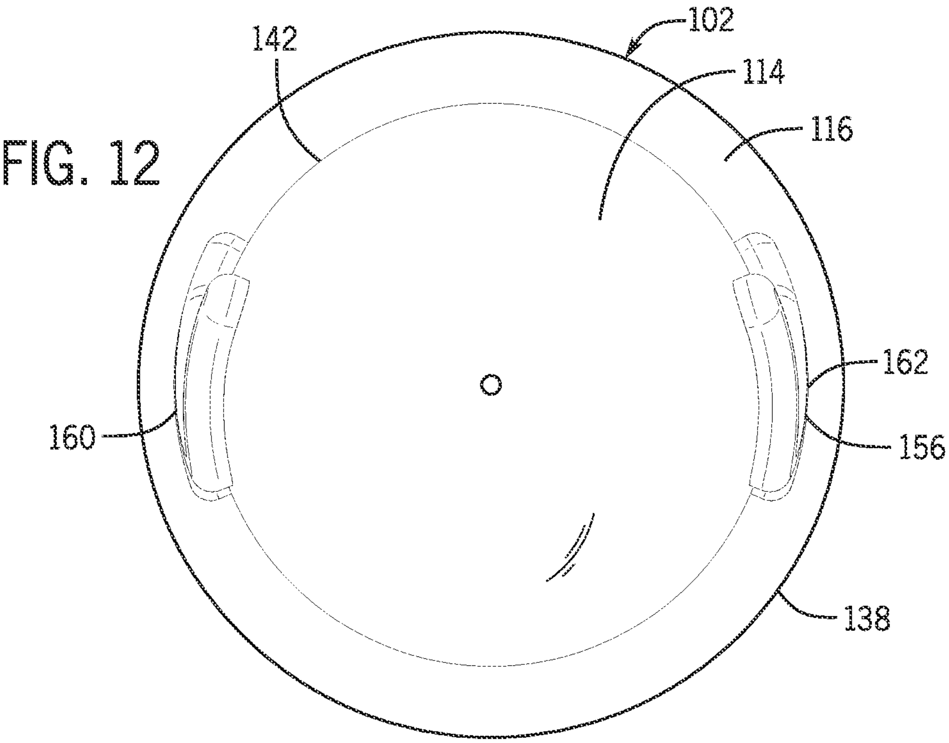
FIG. 12 is a front elevation view of an example of an adult toy as described in the present disclosure.
Figure 13:
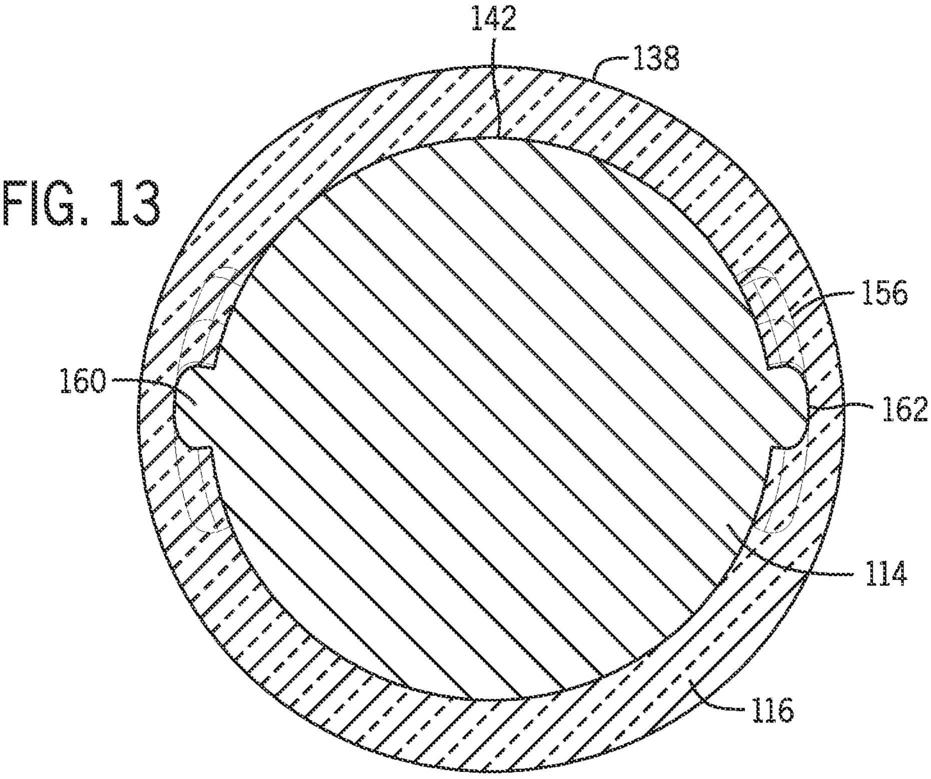
FIG. 13 is a section view taken along line 13-13 of FIG. 11 of an example of an adult toy as described in the present disclosure.
Figure 14:
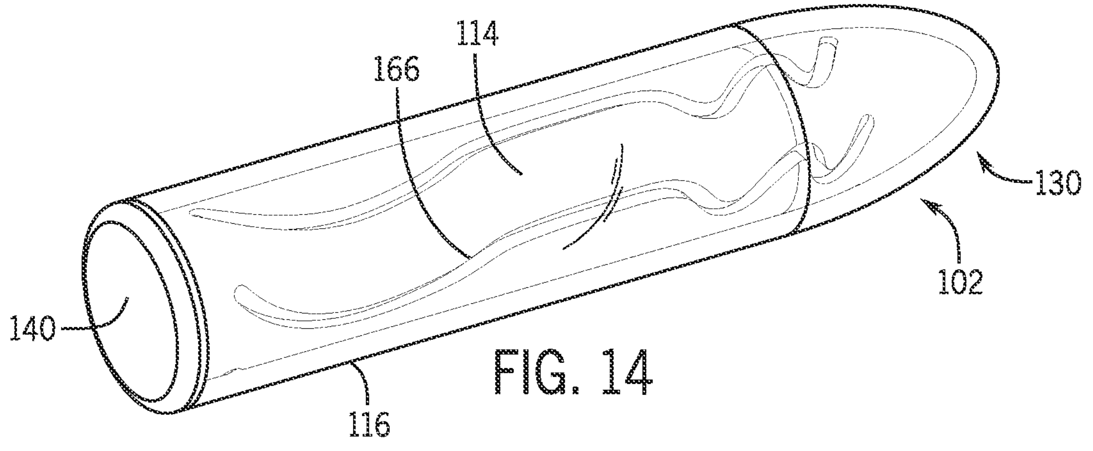
FIG. 14 is a perspective view of an example of an adult toy as described in the present disclosure.
Figure 15:
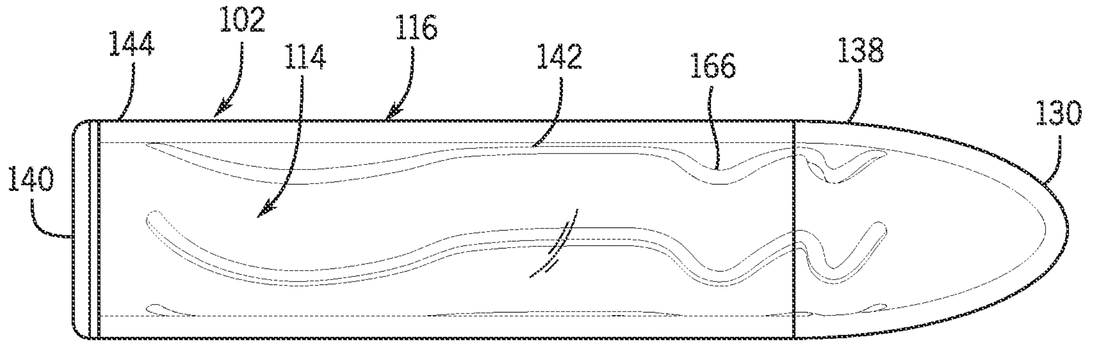
FIG. 15 is a side elevation view of an example of an adult toy as described in the present disclosure.
Figure 16:
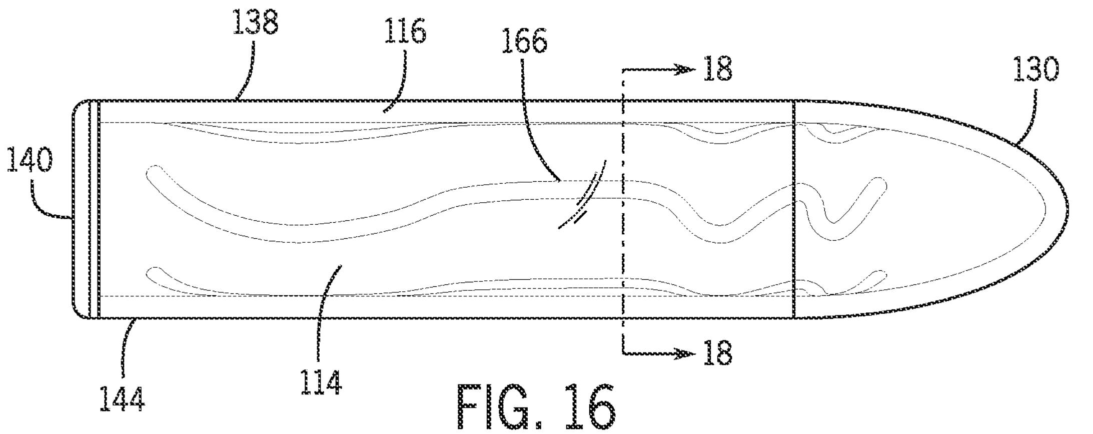
FIG. 16 is a top plan view of an example of an adult toy as described in the present disclosure.
Figure 17:
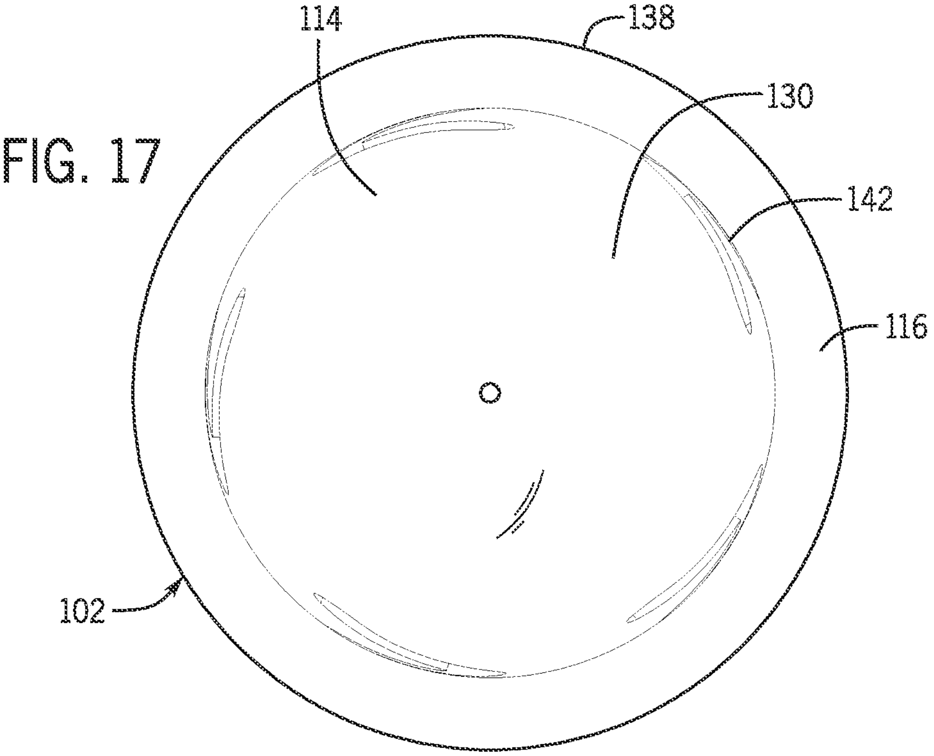
FIG. 17 is a front elevation view of an example of an adult toy as described in the present disclosure.

In general, and with reference to at least FIGS. 9 and 13, structural and/or aesthetic features may be positioned on the outer surface 142 of the inner body 114, which may be overlaid by the outer body 116. Because the outer body 116 may be at least semi-transparent as described above, the structural and/or aesthetic features may enhance the appearance of the toy, or may provide functional benefits in the use of the toy. The structural and/or aesthetic features, referred to as relief features 156, may include protrusion from the inner body, grooves or recesses in the inner body, graphics, colors, pictures, or other aspects that affect the appearance of the inner body. In one example, the relief features 156 may include structures that protrude outwardly away from the outer surface 142 of the inner body 114. The relief features may protrude up to and through the outer surface 138 of the outer body 116. The relief features 156 may also protrude inwardly into the outer surface 142 into the inner body 114, forming grooves or recesses. These relief features 156 may be structures integrally formed of the outer surface 142 of the inner body 114, or may be separate material or structures added to, secured to, attached to, or integrated with, the inner body 114, such as by molding or other securement, adhesion or bonding methods. The relief features 156 may also be structures that are inlaid into the surface but are flush with the outer surface 142 of the inner body 114. The relief features may be attached to the outer surface 142 of the inner body 114, or may be seated and/or anchored in recesses formed in the outer surface 142 of the inner body 114. The relief features 156, where they are separate material or structures positioned on the inner body 114, may be made of natural or man-made materials, including plastic, rubber, metal, wood, or composites. They may be rigid, flexible, reflective, ultra-violet luminescent, absorptive, or have other characteristics.

The outer body 116 may overlay the relief features 156. The relief features may cause a corresponding shape or relief contour to be formed in the outer surface 138 of the outer body 116, such as for example when the thickness of the outer body 116 over the relief feature 156 is the same as, similar to, or greater than the thickness of the outer body 116 over the outer surface 142 of the inner body 114 without a relief feature 156. The relief features 156 may not cause a corresponding or similar resultant shape to be formed in the outer surface 138 of the outer body 116, such as for example when the thickness of the outer body 116 over the relief features 156 is less than the thickness of the outer body 116 over the outer surface 142 of the inner body 114 without a relief feature 156.

Relief features 156 may also be suspended in the outer body 116, and may or may not be combined with relief features 156 positioned on the inner body. See for example FIG. 4*a* (and also FIGS. 2, 3). Such suspended relief features 156 may include metallic flakes, fluorescent pigments, or other visually interesting elements. The relief features 156 suspended in the outer body 116 may be concentrated in the layer thickness of the outer body 116 to be spaced away from the outer surface 138 of the outer body 116. This may reduce or minimize the occurrence of the suspended relief features 156 from being separated from the outer layer 116 caused the friction of use over time. For example, in one example, the suspended relief features 156*a* may be concentrated in the lower 1% of the nominal thickness Tn of the outer layer 116 closest to the inner body 114. Alternatively or additionally, suspended relief features 156*b* may be concentrated in the middle region, such as for example the middle third, of the nominal thickness Tn of the outer body 116. Alternatively or additionally, the suspended relief features 156*c* may be positioned in any region but the 10% of the nominal thickness Tn of the outer body 116 closest to the outer surface 138 of the outer body 116 (Ttop).

One example of a relief feature 156 is shown in FIGS. 9 through 13. In this example, the relief feature 160 is an elongated surface feature, which may protrude from the outer surface 142 of the inner body 114. The relief feature 160 may protrude along its entire length, or may protrude along only part or parts of its length. The parts that do not protrude may be relief features that are flush with the outer surface 142 of the inner body 114, or may be absent, or may be formed as a recess in the outer surface 142 of the inner body 114. The elongated surface feature 160 may extend along a portion of or entirely along the length of the inner body 114, such as for example along at least part of the rear portion 118, and/or the central portion 122 of the inner body 114. Additionally or separately, the feature element 160 may extend along at least part of the length of the front portion 126. Optionally, an additional second elongated surface feature element 162 may extend along a length of the inner body 114, for example including at least part of the central portion 122. Separately or additionally, it may extend along at least part of the length of the front portion 126. One or both of the at least two feature elements 160, 162 may protrude from the outer surface 142 of the inner body 114. The second feature element 162 may be positioned on an opposite side of the main body 114 from the first feature element 160. Either the first and/or the second feature elements 160, 162 may extend in a non-linear manner, such as to form a thin, elongated shape with at least one curved portion. The thin elongated shape may have several curved portions, and may include a combination of straight and curved portions. In this example, the structure of the terminal end 140 of the inner body 114, and the terminal end 144 of the outer body 116, are the same or substantially similar to the example provided in FIGS. 1-4*b*.

The relief feature or features 160, 162 on the inner body 114 may be applied to the outer surface 142 of the inner body 114. In one example, the relief features 160, 162 may each or both be adhered to the outer surface of the main body with adhesive or other types of bonding. The relief features 160, 162 may each or both be molded onto the outer surface 142 of the inner body 114, such as by co-molding. The relief features may each or both be formed in the surface of the inner body 114, such as when the inner body 114 itself is molded, and be integral therewith.

The feature element or elements 160, 162 may protrude from the outer surface 142 of the inner body 114 to a height of $1/5^{th}$ of the actual thickness or the nominal thickness of the outer body 116. Again, the nominal thickness of the outer body 116 may be defined as the thickness of the outer layer 116 overlying the outer surface 142 of the inner body where there is no feature element. The feature element may protrude to a height of ⅞ths or more of the actual thickness of the outer layer 116 or the nominal thickness nominal thickness of the outer layer 116. The feature element or elements may cause a corresponding relief shape in the outer surface 138 of the outer body 116. Depending on the thickness of the outer body 116 overlying the feature element or elements, the outer surface 138 of the outer body 116 may not form a relief shape, or may form a significant relief shape. Where no relief shape is created, the feature element or elements may provide a primarily aesthetic effect. Where a relief shape is formed, the feature element or elements may additionally provide a functional enhancement, such as increased friction, caused by the change in the local height in the outer surface 138 of the outer layer 116.

The feature element or elements 160, 162 may protrude through the outer surface 138 of the outer body 116 to be flush with the nominal thickness of the outer body 116 or to extend above the outer surface 138 of the outer body 116. This protrusion through the outer surface of the outer body 116 is described in greater detail below.

Figure 18:
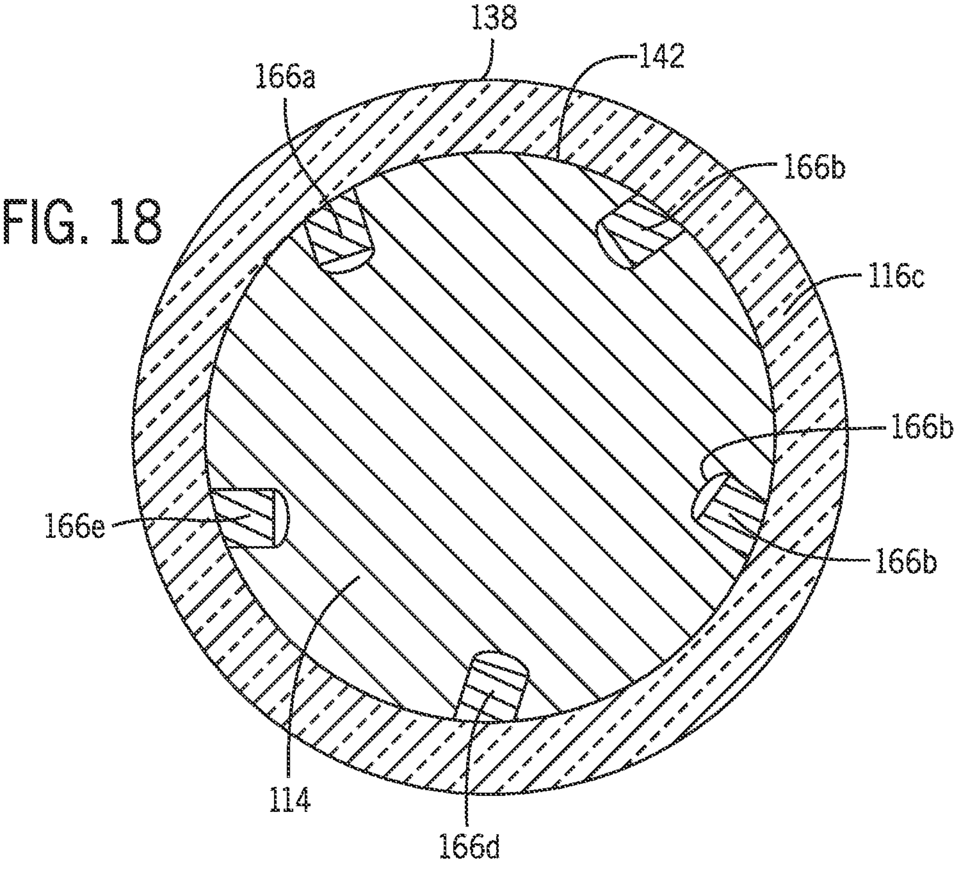
FIG. 18 is a section view taken along line 19-19 of FIG. 16 of an example of an adult toy as described in the present disclosure.
Figure 19:
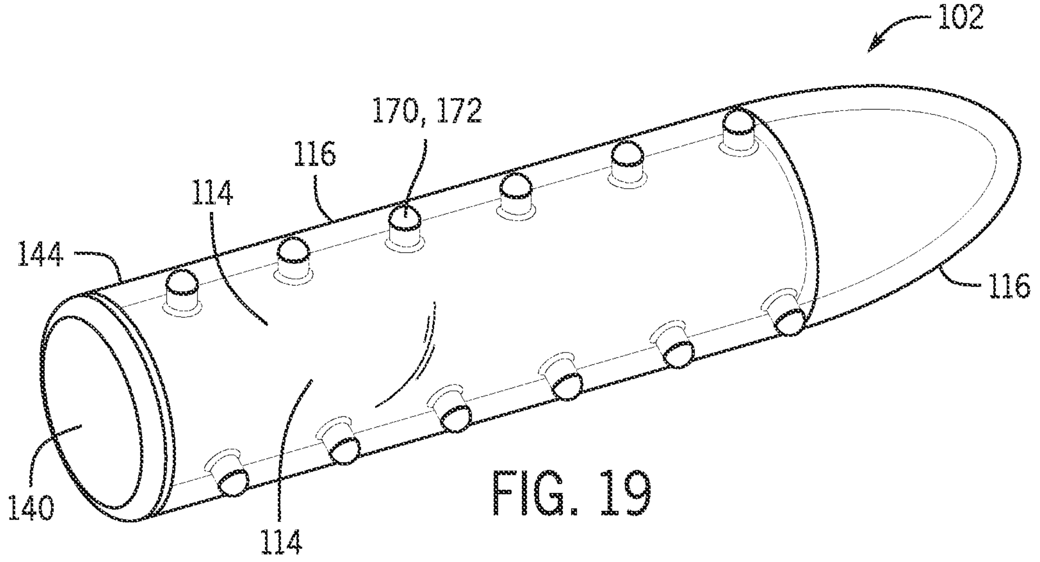
FIG. 19 is a perspective view of an example of an adult toy as described in the present disclosure.

The example shown in FIGS. 14 through 18 show at least one relief feature 166 extending along part of the length of the inner body 114. The at least one relief feature 166 may be positioned in a corresponding recess 168 formed in the outer surface 142 of the inner body 114. The recess 168 is formed in the size and shape as desired, such as for this example as an elongated, narrow shaped groove extending continuously in a non-linear path from near the rear end 140 to near the front tip 130. The material that makes the relief feature 166 is received in the recess 168, and may be flush with the outer surface 142 of the inner body 114, as best shown in FIG. 18. The outer body 116 of the main body 102 overlies the relief feature 166, and in this example the relief feature 166 does not result in a relief shape on the outer surface 138 of the outer body 116. In this example, the structure of the terminal end 140 of the inner body 114, and the terminal end 144 of the outer body 116, are the same or substantially similar to the example provided in FIGS. 1-4*b*.

The relief feature 166 of this example may include more than one relief feature. For example, five separate relief features 166*a*, 166*b*, 166*c*, 166*d*, 166*e*, as best shown in FIG. 18, are received in elongated recesses 168 or grooves in the outer surface 142 of the inner body 114. The five relief features are, in this example, equally spaced around the periphery of the inner body 114, although as an alternative may be not-equally spaced around the periphery of the inner body 114. Additionally, or separately, each relief feature 166*a-e* may be flush with the outer surface 142 of the inner body 114. In another example, any one or more of the relief features 166*a-e* may protrude away from the outer surface 142 of the inner body 114. In another example, the relief feature or features 166 may protrude along a portion of their length, and/or be flush along a portion of their length, and/or be recessed along a portion of their length. The protruding may be along its entire length of the relief feature 166*a-e*, or may only be along a part or parts of the length of the relief feature 166*a-e*.

Figure 20:
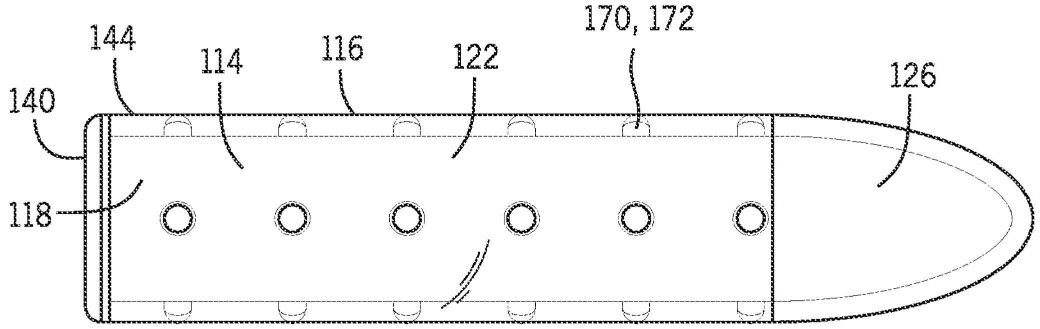
FIG. 20 is a top plan view of an example of an adult toy as described in the present disclosure.
Figure 21:
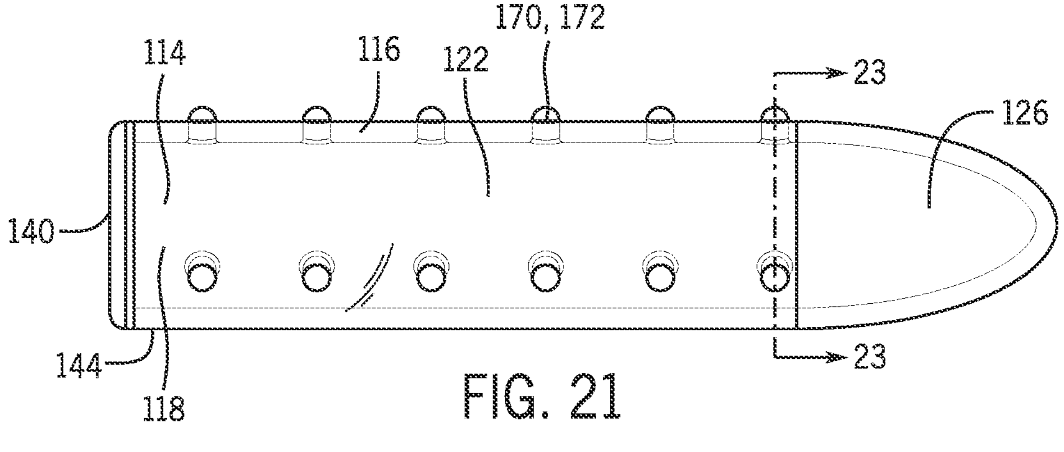
FIG. 21 is a side elevation view of an example of an adult toy as described in the present disclosure.
Figure 22:
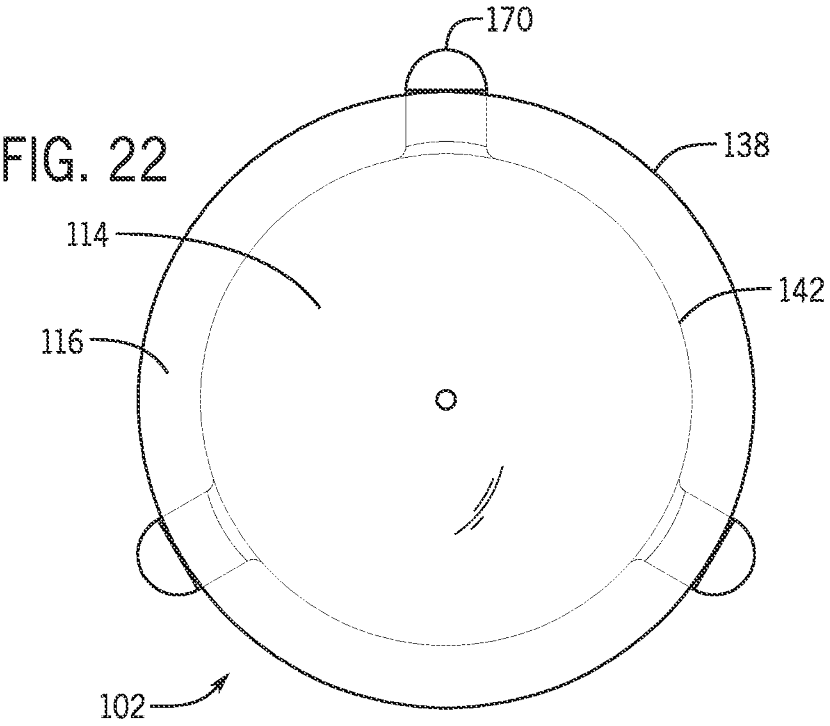
FIG. 22 is a front elevation view of an example of an adult toy as described in the present disclosure.
Figure 23:
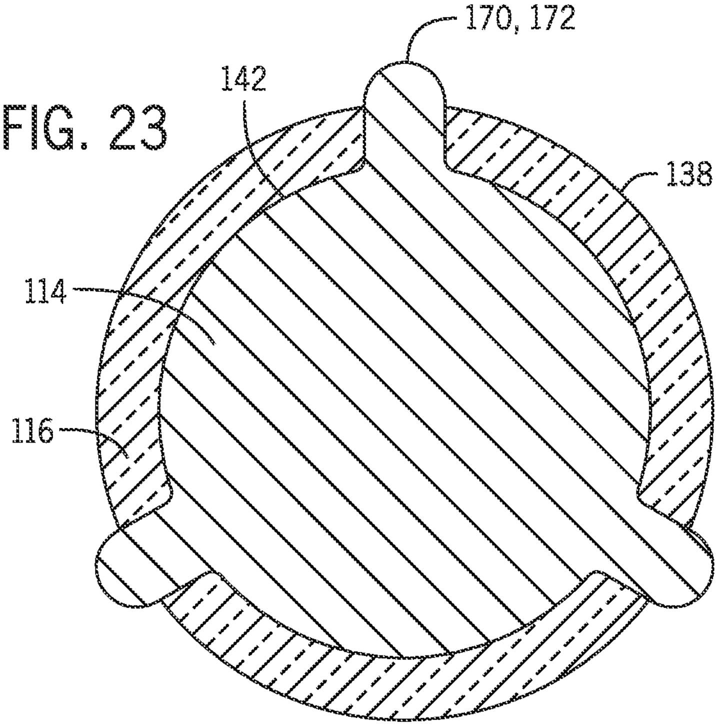
FIG. 23 is a section view taken along line 23-23 of FIG. 21 of an example of an adult toy as described in the present disclosure.

Another example of a relief feature is shown in FIGS. 19 through 23. In this example, the relief feature 170 may be at least one nub 172 protruding outwardly from the outer surface 142 of the inner body 114. The at least one protruding nub 172 may extend outwardly through and past the outer surface 138 of the outer body 116. Optionally, the protruding nub 172 may extend outwardly but not through the outer surface 138 of the outer body 116. Optionally, the protruding nub 172 may extend outwardly to and be flush with the outer surface 138 of the outer body 116. The nub 172 may be formed integrally with the inner body 114 (see FIG. 23), or may be attached to the outer surface 142 of the inner body 114, or may be anchored in a corresponding recess formed in the outer surface of the inner body. There may a plurality of protruding nubs in one example. In this example, the structure of the terminal end 140 of the inner body 114, and the terminal end 144 of the outer body 116, are the same or substantially similar to the example provided in FIGS. 1-4*b*.

Where there are a plurality of protruding nubs 172, in one example some of the nubs (for example three or more) may be aligned linearly, such as in FIG. 20. The linearly aligned nubs may be positioned along at least the central portion 122 of the inner body 114, and/or along the rear portion 118 of the inner body 114, and/or may be positioned along the front portion 126 of the inner body 114. Rows of protruding nubs may be aligned along the length of at least the central portion 122 of the inner body 114 in more than two equally spaced rows. With reference to FIGS. 21 and 22, the rows of nubs 172 may be equidistant from an adjacent row of protruding nubs around the outer perimeter of the inner body 114. In another example, the rows of nubs 172 may be non-equidistant from adjacent rows of protruding nubs. The row of nubs 172 may be non-linear and extend in a shape having one or more curves, linear sections or a combination.

Figure 24:
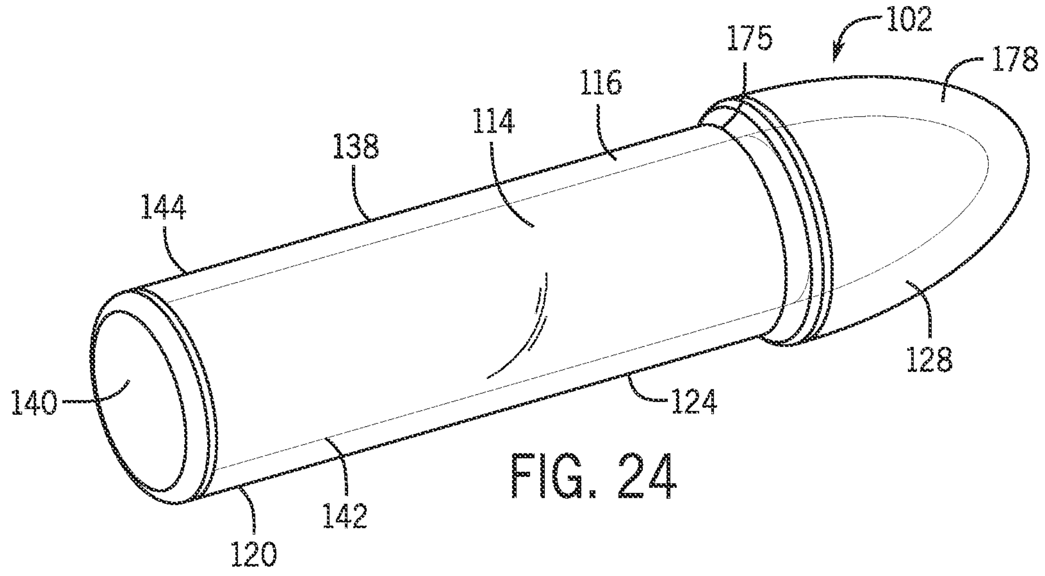
FIG. 24 is a perspective view of an example of an adult toy as described in the present disclosure.
Figure 25:
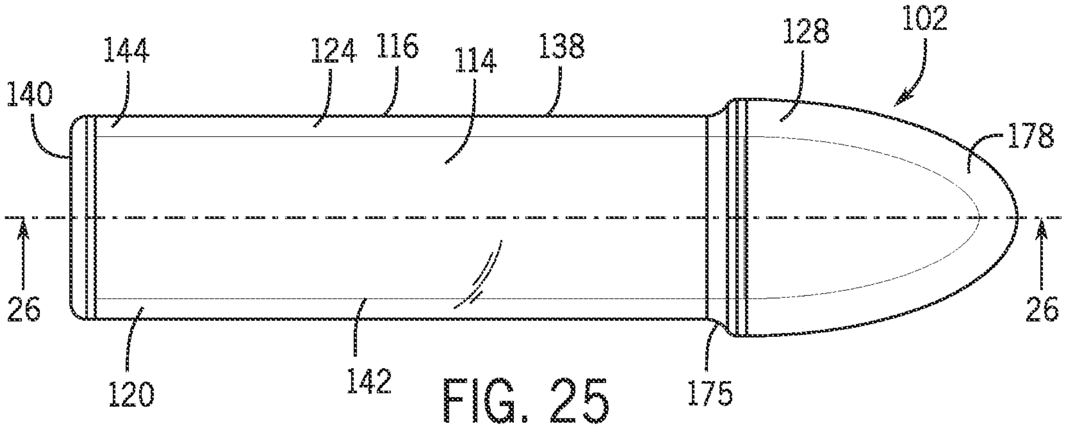
FIG. 25 is a side elevation view of an example of an adult toy as described in the present disclosure.
Figure 26:
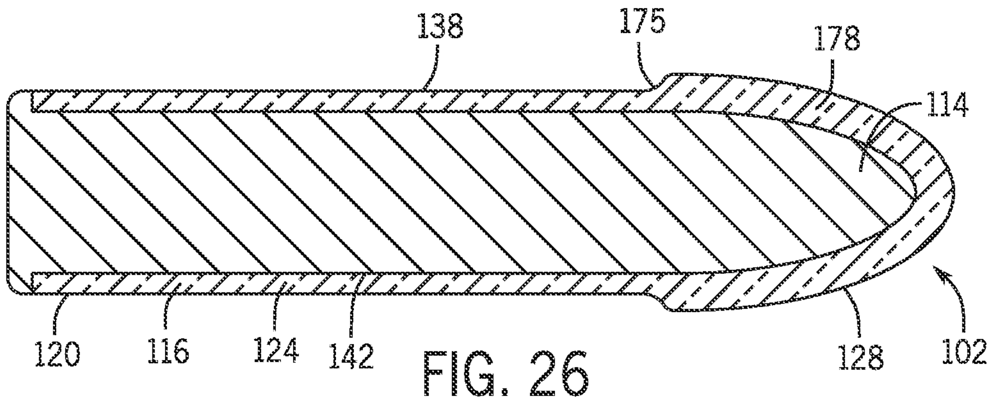
FIG. 26 is a section view taken along line 26-26 of FIG. 25 of an example of an adult toy as described in the present disclosure.

FIGS. 24 through 26 show another example of the main body 102 of the adult toy. The main body 102, inner body 114 and outer body 116 are substantially the same as or similar to the corresponding structure shown in FIGS. 1-4*b*, with the primary difference being the thickness of the outer body 116 over a portion of the inner body 114. In this example, the structure of the terminal end 140 of the inner body 114, and the terminal end 144 of the outer body 116, are the same or substantially similar to the example provided in FIGS. 1-4*b*. This change in thickness of the outer body 116 over only a portion of the inner body 114 may provide enhanced functional performance, such as an additional massaging effect, of the main body 102 due to the change in the relief profile of the outer surface 138 of the outer body 114 (with or without a corresponding relief feature on the inner body 114). In this example, the thickness of the outer body 116 is greater in the front portion 128 of the outer body 116 than the nominal thickness of the outer body 116, such as for example the outer body thickness over the central 122 or rear 118 portions of the inner body 114. This increased thickness of the outer body 116 over at least part of the front portion 128 of the outer body 116 creates a knob-end 178. The knob-end 178 has a shape, in this example, that generally conforms to the shape of the corresponding portion of the inner body (in this case the tip end 130), but is not caused by a protruding or enlarged front portion 126 of the inner body 114. The knob-end 178 may have a shape that is different from the shape of the front portion 126 or front end 130 of the inner body 114, such as for instance a donut shape, a pyramid shape, or other geometric shape, or may be an irregular shape.

In this example, the thickness of the front portion 128 of the outer body 116 over the front portion 126 of the inner body 114 is approximately twice as thick as the nominal thickness. In one example, the nominal thickness is 0.5 cm, or may be as described elsewhere throughout. Other relative thicknesses may be desired for different purposes or portions of the main body 102. For instance, an outer body thickness of 1.5× the nominal thickness may be appropriate for a peripheral band (for example 0.5 centimeters wide) formed continuously or discontinuously around the outer body 116 at the transition between the central portion 124 and the front portion 128 of the outer body 116. The transition in the thickness of the outer body 116, in this case between the central portion 124 and the front portion 128, is a fillet or sloping shoulder structure 175, but may alternatively be an abrupt step transition or other shape.

Figure 27:
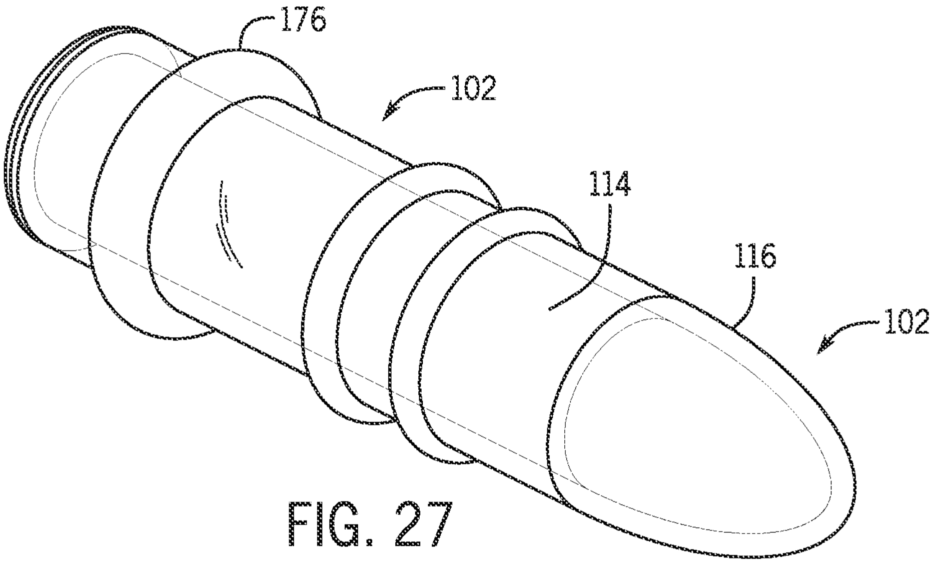
FIG. 27 is a perspective view of an example of an adult toy as described in the present disclosure.
Figure 28:
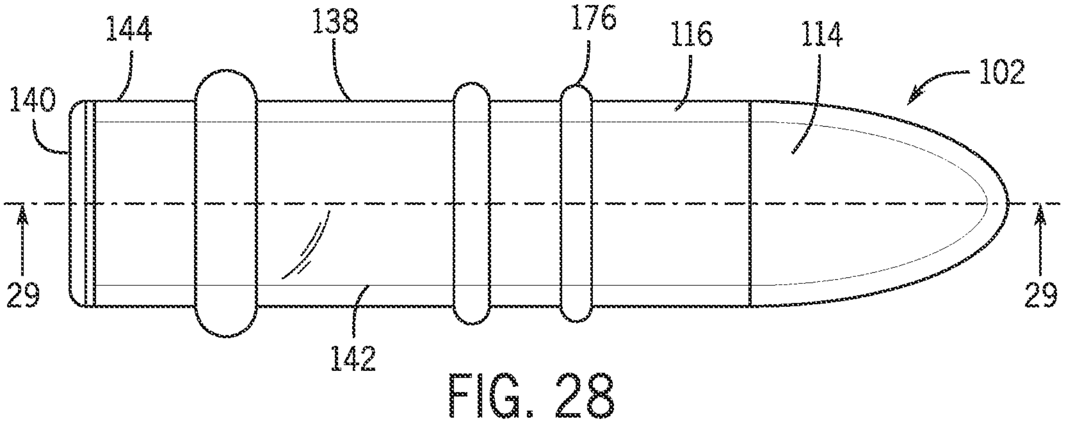
FIG. 28 is a side elevation view of an example of an adult toy as described in the present disclosure.
Figure 29:
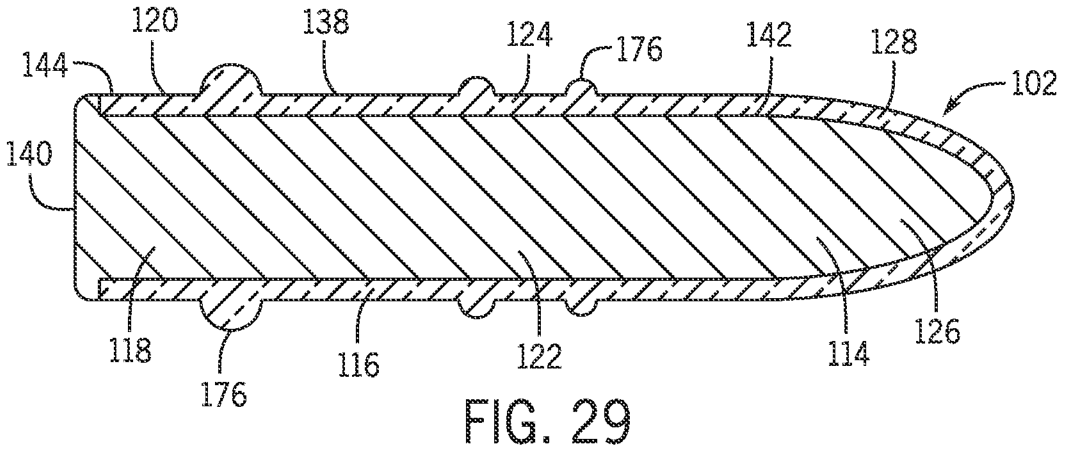
FIG. 29 is a section view taken along line 29-29 of FIG. 28 of an example of an adult toy as described in the present disclosure.
Figure 30:
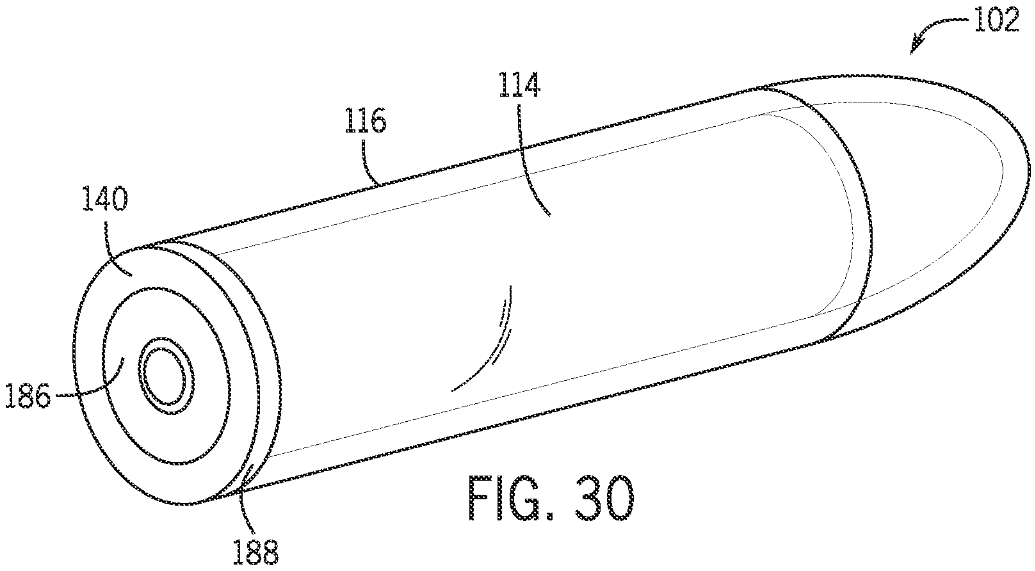
FIG. 30 is a perspective view of an example of an adult toy as described in the present disclosure.

The thickness of the outer body 116 may be greater at any position overlaying the inner body 114, or may be greater in select locations overlaying the inner body 114. For instance, the thickness of the outer body 116 may be thicker in discrete locations along part of the central portion 124 of the outer body 116, forming one or a plurality of ribs 176 extending outwardly from the outer surface 138 of the outer body 116. See FIGS. 27-29. These ribs 176 may be located in one or many locations on the outer body. The ribs 176 may extend annularly (continuously or discontinuously) around the outer body 116. The ribs 176 may be spaced apart at regular intervals, for example of 1.5 cm apart, or may be spaced apart by different amounts. There may only be one rib 176. Where more than one rib 176, the ribs 176 may be of the same relief height (for example 0.5 cm) greater than the nominal thickness of the outer layer 116, or may be of different heights (for example, 0.2 cm, 0.4 cm, 0.6 cm for three ribs) greater than the nominal thickness.

FIGS. 30 through 33 are an example of the adult toy according to the present invention. The main body 102, inner body 114 and outer body 116 are substantially the same as or similar to the corresponding structure shown and described with respect to FIGS. 1-4*b*, with the primary difference being that the inner body 114 includes a recess or cavity 180 for receiving a container 182, as described below. The inner body 114 defines a cavity 180 extending from the rear end 140 toward the tip end 130, with an opening 184 to the cavity 180 formed at the rear end 140. The container 182 in this example defines a closed rear end 186 and a rim 188, and an open front end 190. The rim 188 fits into a recess 200 formed annularly about the opening 184. The rim 188 may be flush with the rim 146 formed in the rear end 140 of the inner body 114. The rear end 144 of the outer body may engage the rim 146 of the outer body 116 similar to those shown and described in FIGS. 1-4*b*.

The container 182 may be received in the recess 180. The container 182 includes an open front end 190 and a closed rear end wall 192 forming the closed end 186, and may have an elongated tubular shape formed by a cylindrical side wall 194 defining an internal compartment or cavity 196. The front end of the container 182 may be closed off by a wall (not shown). In the example shown, the internal cavity 180 of the inner body 114 extends beyond the front end of the container 182. In some examples, the internal cavity 180 of the inner body 114 may be the same or substantially the same length as the container 182, and the end of the cavity 180 may act to cover or close the open front end of the container 182. The rear end wall 192 of the container 182 may be removable attached, such as for example by a press fit, or corresponding threads, from the sidewall of the container 182 and act as a cap or cover for the compartment inside the container 182. This removable end wall 192 would then allow access to the container without removing the container from the cavity 180. The container 182 defines a central compartment 196 extending from the front end 198 to the closed rear end 186. The container 182 may be removable from the recess 180.

Figure 31:
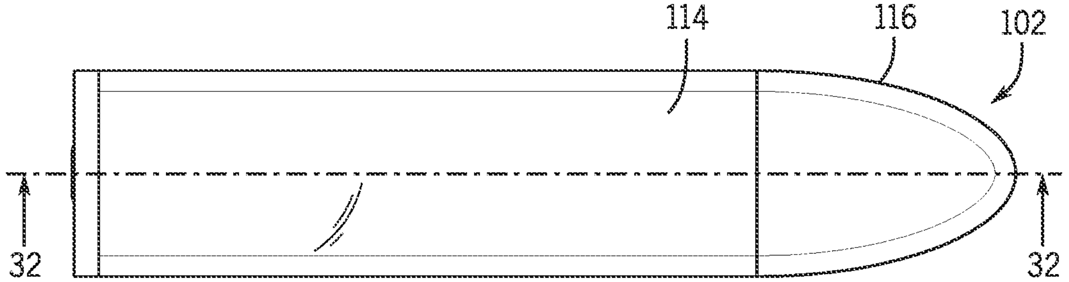
FIG. 31 is a side elevation view of an example of an adult toy as described in the present disclosure.
Figure 32:
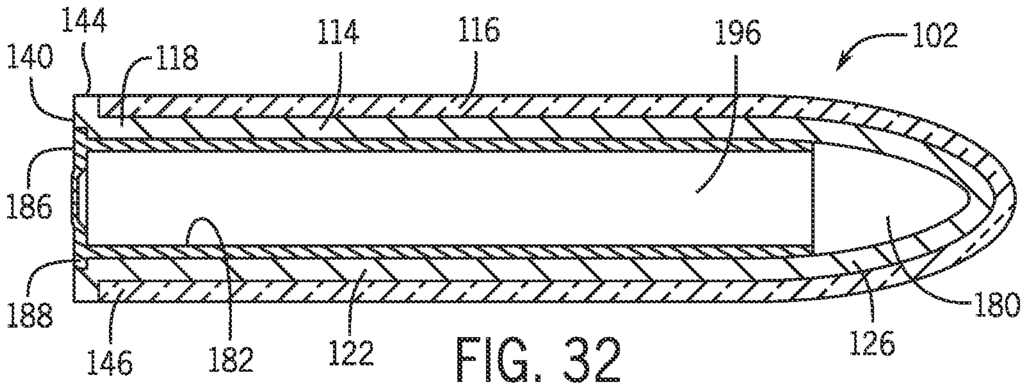
FIG. 32 is a section view taken along line 32-32 of FIG. 31 of an example of an adult toy as described in the present disclosure.
Figure 33:
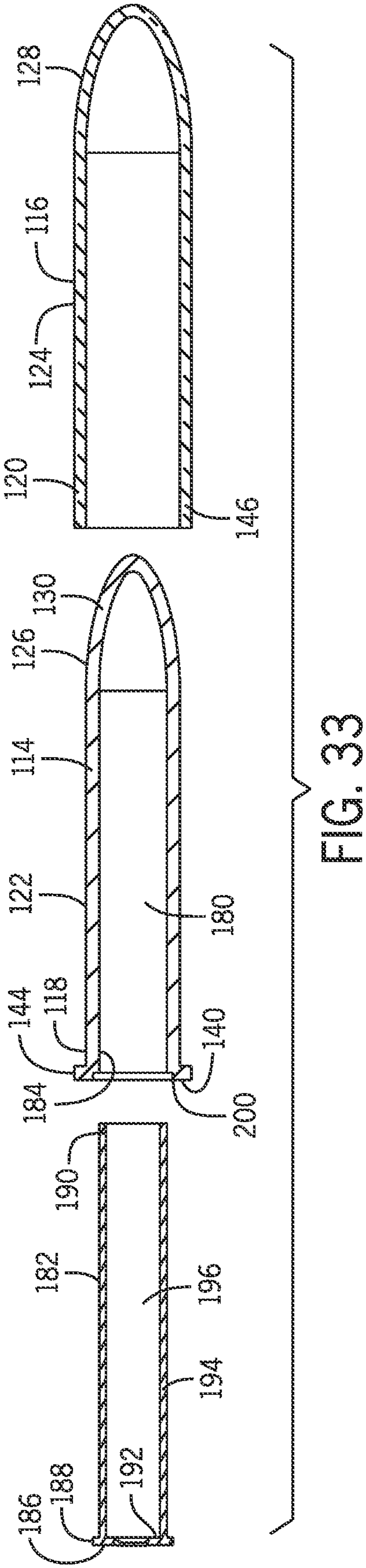
FIG. 33 is an exploded view of an example of an adult toy as described in the present disclosure.

The container 182 provides an internal compartment or cavity space 196, which may be used to house electronics related to a vibrating motor, or may be used to store items if desired. The exploded view in FIG. 31 shows the container removed from the recess 180 of the inner body 114, and the inner body removed from the outer body 116. The inner body 114 may be permanently bonded to the outer body 116 and may not be removable from one another. In one example, the container 182 may not be removable (e.g. for example it may be permanently bonded) from within the cavity 180 of the inner body 114, and in this example may be accessible through the cap or cover formed by the removable end wall 192 as noted above.

The inner body 114 and outer body 116 used as examples herein have focused on a single inner body 114 and a single outer body 116. The adult toy of the present description and according to the instant invention may also include more than one inner body 114, each with an outer body 116, or may include more than one inner body 114 with less than all inner bodies 114 having an outer body 116.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An adult toy comprising:

a main body including a rear, central and front portions and defining a tip end and a rear end, and including an inner body and a flexible silicone outer body overlaying at least a portion of the inner body, each of the inner body and outer body defining a rear, central and front portion corresponding to the rear, central and front portion of the main body;

the central portion of the inner body defining at least in part an elongated shape;

the front portion of the inner body defining a tapering cone-shape with a rounded front end; and the outer body overlaying at least a portion of the inner body, wherein the inner body is at least partially visible through the outer body and at least a first portion of the outer body is transparent and a second portion of the outer body limits visibility of the inner body;

wherein:

the inner body defines an outer surface and a feature element is positioned on the outer surface of the inner body;

the outer body defines an outer surface, the outer body overlays the outer surface of the inner body and the at least one feature element, the outer body having a tapering cone shape with a rounded front end positioned over the tapering cone shape of the front portion of the inner body, and a thickness of the outer body over the feature element is less than a thickness of the outer body over the outer surface of the inner body without the feature element such that a resultant shape of the feature element is not formed in the outer surface of the outer body.

2. The toy as defined in claim 1, wherein a thickness of the outer body on the central portion is consistent.

3. The toy as defined in claim 1, wherein a thickness of the outer body over the front portion is greater than a thickness of the outer body over the central portion.

4. The toy as defined in claim 3, wherein:

the thickness of the outer body over the front portion is about twice as thick as the thickness of the outer body over the central portion.

5. The toy as defined in claim 1, wherein the outer surface replicates the shape of the central portion and the front portion of the inner body.

6. The toy as defined in claim 1, wherein:

a second feature element is positioned on the outer surface of the inner body;

the outer body defines relief contour in the outer surface, wherein the outer body overlays the outer surface of the inner body and the relief contour overlays the second feature element, and a thickness of the outer body over the second feature element is the same as or less than a thickness of the outer body over the outer surface of the inner body without the second feature element.

7. The toy as defined in claim 6, wherein:

the feature element is a first feature element extending along a majority of the length of the inner body including along at least part of the central portion and at least part of the front portion; and the second feature element extends along a majority of the length of the inner body including at least part of the central portion and at least part of the front portion; and the first feature element and the second feature element protrude from the outer surface of the inner body.

8. The toy as defined in claim 7, wherein the second feature element is positioned on an opposite side from the first feature element.

9. The toy as defined in claim 7, wherein the first and second feature elements each extend in a non-linear manner.

10. The toy as defined in any of claim 6, wherein the second feature element is flush with the outer surface of the outer body.

11. The toy as defined in claim 6, wherein:

a. the the second feature element is a plurality of protruding nubs extending from the outer surface of the inner body; and b. the plurality of protruding nubs are exposed through the outer surface of the outer body.

12. The toy as defined in any of claim 11, wherein a portion of the plurality of protruding nubs are aligned linearly along at least the central portion of the inner body.

13. The toy as defined in any of claim 12, wherein a portion of the plurality of protruding nubs are aligned along the length of at least the central portion of the inner body in more than two equally spaced rows.

14. The toy as defined in claim 13, wherein there are three rows of protruding nubs aligned along at least the central portion and spaced equidistant from an adjacent row.

15. The toy as defined in claim 1, wherein:

the feature element is embedded in a recess formed in the outer surface of the inner body; and the feature element protrudes from the outer surface of the inner body.

16. The toy as defined in claim 15, wherein the recess formed in the outer surface of the inner body corresponds to the shape of the feature element.

17. The toy as defined in claim 1, wherein a second feature element is separate from the inner body and suspended in the outer body.

18. The toy as defined in claim 1, wherein:

the feature element is attached to the outer surface of the inner body.

19. The toy as defined in claim 1, wherein:

the inner body defines a recess with an opening defined in the rear portion;

a container defining an interior chamber having an open front end and a closed rear end; and wherein the container is received within the recess, with the open front end oriented toward the front portion of the inner body and the closed rear end oriented toward the rear portion of the inner body.

20. The toy as defined in claim 1, wherein the outer body defines a circular cross section at at least one location along its length.

21. The toy as defined in claim 1, wherein the inner body defines a circular cross section at at least one location along its length.

* * * * *